United States Patent
Svendsen

(10) Patent No.: US 8,620,699 B2
(45) Date of Patent: Dec. 31, 2013

(54) HEAVY INFLUENCER MEDIA RECOMMENDATIONS

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 1421 days.

(21) Appl. No.: 11/463,157

(22) Filed: Aug. 8, 2006

(65) Prior Publication Data

US 2009/0083116 A1    Mar. 26, 2009

(51) Int. Cl.
- *G06Q 30/00* (2012.01)
- *G06Q 50/00* (2012.01)
- *G06F 7/06* (2006.01)
- *G06F 17/30* (2006.01)

(52) U.S. Cl.
USPC ............... 705/5; 705/80; 705/14.4; 709/231; 709/230; 709/232; 709/238

(58) Field of Classification Search
USPC ......................... 709/217; 705/14, 15, 13, 105
See application file for complete search history.

(56) References Cited

U.S. PATENT DOCUMENTS

| | | |
|---|---|---|
| 4,870,579 A | 9/1989 | Hey |
| 5,621,456 A | 4/1997 | Florin et al. |
| 5,724,567 A | 3/1998 | Rose et al. |
| 5,765,028 A | 6/1998 | Gladden |
| 5,771,778 A | 6/1998 | MacLean, IV |
| 5,864,854 A | 1/1999 | Boyle |
| 5,878,218 A | 3/1999 | Maddalozzo, Jr. et al. |
| 5,884,031 A | 3/1999 | Ice |
| 5,946,464 A | 8/1999 | Kito et al. |
| 5,956,027 A | 9/1999 | Krishnamurthy |
| 5,960,437 A | 9/1999 | Krawchuk et al. |
| 5,963,916 A | 10/1999 | Kaplan |
| 6,003,030 A | 12/1999 | Kenner et al. |
| 6,012,083 A | 1/2000 | Savitzky et al. |
| 6,049,821 A | 4/2000 | Theriault et al. |
| 6,134,552 A | 10/2000 | Fritz et al. |
| 6,141,759 A | 10/2000 | Braddy |
| 6,195,657 B1 | 2/2001 | Rucker et al. |
| 6,212,520 B1 | 4/2001 | Maruyama et al. |
| 6,216,151 B1 | 4/2001 | Antoun |
| 6,253,234 B1 | 6/2001 | Hunt et al. |
| 6,266,649 B1 | 7/2001 | Linden et al. |
| 6,314,420 B1 | 11/2001 | Lang et al. |

(Continued)

FOREIGN PATENT DOCUMENTS

| | | |
|---|---|---|
| CN | 1208930 A | 2/1999 |
| CN | 1614931 A | 5/2005 |

(Continued)

OTHER PUBLICATIONS http://www.stereogum.com/1366/robert_smiths_celebrity_playlist/news/ "Robert Smith's Celebrity Playlist" Apr. 5, 2005.*

(Continued)

*Primary Examiner* — Randy Scott

(57) ABSTRACT

A system and method for providing media recommendations, such as music recommendations, based on information identifying media recently played by a select group of heavy influencers for a subscription fee are provided. The group of heavy influencers may be a group of one or more celebrities or other persons whose media selections may heavily influence media selections of the users of the system.

40 Claims, 7 Drawing Sheets

(56) References Cited

U.S. PATENT DOCUMENTS

| | | |
|---|---|---|
| 6,317,722 B1 | 11/2001 | Jacobi et al. |
| 6,336,115 B1 | 1/2002 | Tominaga et al. |
| 6,353,823 B1 | 3/2002 | Kumar |
| 6,374,289 B2 | 4/2002 | Delaney et al. |
| 6,388,714 B1 | 5/2002 | Schein et al. |
| 6,438,579 B1 | 8/2002 | Hosken |
| 6,438,759 B1 | 8/2002 | Hosken |
| 6,490,625 B1 | 12/2002 | Islam et al. |
| 6,498,955 B1 | 12/2002 | McCarthy et al. |
| 6,507,727 B1 | 1/2003 | Henrick |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,633,901 B1 | 10/2003 | Zuili |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,728,729 B1 | 4/2004 | Jawa et al. |
| 6,754,904 B1 | 6/2004 | Cooper et al. |
| 6,757,517 B2 | 6/2004 | Chang |
| 6,757,691 B1 | 6/2004 | Welsh et al. |
| 6,801,909 B2 | 10/2004 | Delgado et al. |
| 6,807,641 B1 | 10/2004 | Ishiguro et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,985,588 B1 | 1/2006 | Glick et al. |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,069,310 B1 | 6/2006 | Bartholomew |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,085,747 B2 | 8/2006 | Schaffer et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,146,627 B2 | 12/2006 | Ismail et al. |
| 7,171,174 B2 | 1/2007 | Ellis et al. |
| 7,177,872 B2 | 2/2007 | Schwesig et al. |
| 7,194,555 B2 | 3/2007 | Scibora |
| 7,203,711 B2 | 4/2007 | Borden et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,277,766 B1 | 10/2007 | Khan et al. |
| 7,277,955 B2 | 10/2007 | Elliott |
| 7,283,992 B2 | 10/2007 | Liu et al. |
| 7,296,032 B1 | 11/2007 | Beddow |
| 7,305,449 B2 | 12/2007 | Simpson et al. |
| 7,310,629 B1 | 12/2007 | Mendelson et al. |
| 7,340,481 B1 | 3/2008 | Baer et al. |
| 7,356,187 B2 | 4/2008 | Shanahan et al. |
| 7,437,364 B1 | 10/2008 | Fredricksen et al. |
| 7,441,041 B2 | 10/2008 | Williams et al. |
| 7,444,339 B2 * | 10/2008 | Matsuda et al. ............... 1/1 |
| 7,457,790 B2 | 11/2008 | Kochunni et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,542,992 B2 | 6/2009 | Pandurangan et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,668,821 B1 | 2/2010 | Donsbach et al. |
| 7,676,753 B2 * | 3/2010 | Bedingfield ............... 715/745 |
| 7,680,959 B2 | 3/2010 | Svendsen |
| 7,720,871 B2 | 5/2010 | Rogers et al. |
| 7,725,494 B2 | 5/2010 | Rogers et al. |
| 7,734,569 B2 | 6/2010 | Martin et al. |
| 7,751,773 B2 | 7/2010 | Linden |
| 7,761,399 B2 | 7/2010 | Evans |
| 7,765,192 B2 | 7/2010 | Svendsen |
| 7,805,129 B1 * | 9/2010 | Issa et al. ............... 455/412.1 |
| 7,827,110 B1 | 11/2010 | Wieder |
| 7,877,387 B2 | 1/2011 | Hangartner |
| 7,970,922 B2 * | 6/2011 | Svendsen ............... 709/231 |
| 8,059,646 B2 | 11/2011 | Svendsen et al. |
| 8,200,602 B2 | 6/2012 | Farrelly |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2001/0051996 A1 | 12/2001 | Cooper et al. |
| 2002/0025141 A1 | 2/2002 | Matsumoto et al. |
| 2002/0033844 A1 | 3/2002 | Levy et al. |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0052885 A1 | 5/2002 | Levy |
| 2002/0065074 A1 | 5/2002 | Cohn et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 * | 9/2002 | Zimmerman ............... 725/46 |
| 2002/0152318 A1 | 10/2002 | Menon et al. |
| 2002/0152396 A1 | 10/2002 | Fox et al. |
| 2002/0156546 A1 | 10/2002 | Ramaswamy |
| 2002/0157002 A1 | 10/2002 | Messerges et al. |
| 2002/0165793 A1 | 11/2002 | Brand et al. |
| 2002/0178057 A1 | 11/2002 | Bertram et al. |
| 2002/0194264 A1 | 12/2002 | Uchiyama et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 * | 1/2003 | Blatter et al. ............... 707/6 |
| 2003/0018799 A1 | 1/2003 | Eyal |
| 2003/0023427 A1 | 1/2003 | Cassin et al. |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |

(56) References Cited

U.S. PATENT DOCUMENTS

| | | |
|---|---|---|
| 2003/0206717 A1 | 11/2003 | Yogeshwar et al. |
| 2003/0227478 A1 | 12/2003 | Chatfield |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0057348 A1 | 3/2004 | Shteyn et al. |
| 2004/0064500 A1 | 4/2004 | Kolar et al. |
| 2004/0073919 A1 | 4/2004 | Gutta |
| 2004/0088271 A1 | 5/2004 | Cleckler |
| 2004/0088348 A1 | 5/2004 | Yeager et al. |
| 2004/0091235 A1 | 5/2004 | Gutta |
| 2004/0096110 A1 | 5/2004 | Yogeshwar et al. |
| 2004/0107821 A1 | 6/2004 | Alcalde et al. |
| 2004/0117828 A1 | 6/2004 | Parker et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0137882 A1 | 7/2004 | Forsyth |
| 2004/0158865 A1 | 8/2004 | Kubler et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0010616 A1 | 1/2005 | Burks |
| 2005/0015713 A1 | 1/2005 | Plastina et al. |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060350 A1 | 3/2005 | Baum et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0108303 A1 | 5/2005 | Carter |
| 2005/0119977 A1 | 6/2005 | Raciborski |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1* | 7/2005 | Shin et al. ................. 725/104 |
| 2005/0197961 A1 | 9/2005 | Miller et al. |
| 2005/0216855 A1 | 9/2005 | Kopra et al. |
| 2005/0228830 A1 | 10/2005 | Plastina et al. |
| 2005/0240494 A1 | 10/2005 | Cue et al. |
| 2005/0246391 A1 | 11/2005 | Gross |
| 2005/0251455 A1 | 11/2005 | Boesen |
| 2005/0251576 A1 | 11/2005 | Weel |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0273825 A1 | 12/2005 | Eldeeb |
| 2005/0278377 A1* | 12/2005 | Mirrashidi et al. ........ 707/104.1 |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085349 A1 | 4/2006 | Hug |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1* | 7/2006 | Bedingfield .................. 715/738 |
| 2006/0159109 A1 | 7/2006 | Lamkin et al. |
| 2006/0161635 A1 | 7/2006 | Lamkin et al. |
| 2006/0167991 A1 | 7/2006 | Heikes et al. |
| 2006/0168351 A1 | 7/2006 | Ng et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195462 A1 | 8/2006 | Rogers |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200432 A1 | 9/2006 | Flinn et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0242206 A1 | 10/2006 | Brezak et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1 | 12/2006 | Miyajima et al. |
| 2007/0005793 A1 | 1/2007 | Miyoshi et al. |
| 2007/0005990 A1 | 1/2007 | Sathish |
| 2007/0008927 A1 | 1/2007 | Herz et al. |
| 2007/0014536 A1 | 1/2007 | Hellman |
| 2007/0022437 A1* | 1/2007 | Gerken ........................ 725/41 |
| 2007/0028171 A1 | 2/2007 | MacLaurin |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |

(56) References Cited

U.S. PATENT DOCUMENTS

| | | |
|---|---|---|
| 2007/0083471 A1 | 4/2007 | Robbin et al. |
| 2007/0083553 A1* | 4/2007 | Minor .................. 707/104.1 |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0104138 A1 | 5/2007 | Rudolf et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0168540 A1 | 7/2007 | Hansson |
| 2007/0174147 A1 | 7/2007 | Klein, Jr. |
| 2007/0195373 A1 | 8/2007 | Singh |
| 2007/0198485 A1 | 8/2007 | Ramer et al. |
| 2007/0198746 A1 | 8/2007 | Myllyla et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0220575 A1 | 9/2007 | Cooper et al. |
| 2007/0233736 A1 | 10/2007 | Xiong et al. |
| 2007/0233743 A1 | 10/2007 | Rosenberg |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0046948 A1 | 2/2008 | Verosub |
| 2008/0052371 A1 | 2/2008 | Partovi et al. |
| 2008/0052630 A1 | 2/2008 | Rosenbaum et al. |
| 2008/0080774 A1 | 4/2008 | Jacobs et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147711 A1 | 6/2008 | Spiegelman et al. |
| 2008/0162435 A1 | 7/2008 | Dooms et al. |
| 2008/0162655 A1 | 7/2008 | Khedouri et al. |
| 2008/0189655 A1 | 8/2008 | Kol |
| 2008/0195664 A1 | 8/2008 | Maharajh et al. |
| 2008/0208823 A1 | 8/2008 | Hicken |
| 2008/0209013 A1 | 8/2008 | Weel |
| 2008/0235632 A1 | 9/2008 | Holmes |
| 2008/0244681 A1 | 10/2008 | Gossweiler et al. |
| 2008/0261516 A1 | 10/2008 | Robinson |
| 2008/0270561 A1 | 10/2008 | Tang et al. |
| 2008/0288588 A1 | 11/2008 | Andam et al. |
| 2008/0306826 A1 | 12/2008 | Kramer et al. |
| 2008/0319833 A1 | 12/2008 | Svendsen |
| 2009/0007198 A1 | 1/2009 | Lavender et al. |
| 2009/0042545 A1 | 2/2009 | Avital et al. |
| 2009/0055396 A1 | 2/2009 | Svendsen et al. |
| 2009/0055759 A1 | 2/2009 | Svendsen |
| 2009/0069911 A1 | 3/2009 | Stefik |
| 2009/0069912 A1 | 3/2009 | Stefik |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077084 A1 | 3/2009 | Svendsen |
| 2009/0077124 A1 | 3/2009 | Spivack et al. |
| 2009/0077220 A1 | 3/2009 | Svendsen et al. |
| 2009/0083362 A1 | 3/2009 | Svendsen |
| 2009/0129671 A1 | 5/2009 | Hu et al. |
| 2010/0031366 A1* | 2/2010 | Knight et al. .................. 726/26 |
| 2010/0185732 A1 | 7/2010 | Hyman |
| 2011/0016483 A1 | 1/2011 | Opdycke |
| 2011/0034121 A1 | 2/2011 | Ng et al. |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | WO 00/54462 | 9/2000 |
| WO | WO 01/02905 | 1/2001 |
| WO | 01/25947 A1 | 4/2001 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Last.fm" from Wikipedia, http://en.wikipedia.org/wiki/Last.fm, printed Aug. 8, 2006, 7 pages.

"Subscribe to Napster" from Napster website, www.napster.com/subscribe, copyright 2003-2006, Napster, LLC, 2 pages.

"Frequently Asked Questions" from Pandora website, http://blog.pandora.com/faq, copyright 2005-2006, Pandora Media, Inc., 20 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Outlook Home Page—Microsoft Office Online," http://office.microsoft.com/en-us/outlook/default.aspx, copyright 2007 Microsoft Corporation, printed Nov. 8, 2007, 1 page.

"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyourmusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

(56) References Cited

OTHER PUBLICATIONS

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story? track=tothtml, 5 pages.
Yahoo! Music downloaded archival page from www.archive.org for Jun. 20, 2005, copyright 2005 Yahoo! Inc., 14 pages.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
"Babulous :: Keep it loud," http://www.babulous.com/home.jhtml, copyright 2009 Babulous Inc., printed Mar. 26, 2009, 2 pages.
Jennifer Golbeck, "Trust and Nuanced Profile Similarity in Online Social Networks," available from http://www.cs.umd.edu/~golbeck/publications.shtml, 2008, 30 pages.
"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.
"Tours Profile," http://mog.com/Tour, copyright 2006-2009 Mog Inc., printed Aug. 3, 2009, 11 pages.
"Ringo: Social Information Filtering for Music Recommendation," http://jolomo.net/ringo.html, printed Aug. 3, 2009, 1 page.
"About uPlayMe," copyright 2008 uPlayMe, Inc., 4 pages.
"Collect everything you listen to and watch in one place, and effortlessly share them with your friends.," copyright 2008 uPlayMe, Inc., 1 page.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"Hulu—About," www.hulu.com/about/product_tour, copyright 2010 Hulu LLC, printed Jun. 15, 2010, 2 pages.
Nilson, Martin, "id3v2.4.0-frames—ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"Anthem—Overview," at <http://www.intercastingcorp.com/platform/anthem>, copyright 2004-2007, Intercasting Corp., printed Jan. 16, 2008, 2 pages.
"MyStrands Labs: Patent-pending Technologies," at <http://labs.mystrands.com/patents.html>, printed Feb. 7, 2007, 5 pages.
Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download?doi=10.1.1.108.3459&rep=rep1&type=pdf>, 10 pages.
"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Apple—iPod classic," http://www.apple.com/ipodclassic/, printed Oct. 26, 2007, 1 page.
"betterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"ChoiceStreann Technology Brief, Review of Personalization Technologies: Collaborative Filtering vs. ChoiceStream's Attributized Bayesian Choice Modeling," 13 pages, Oct. 2006.
"The Classic TV Database—Your Home for Classic TV!—www.classic-tv.com," http://www.classic-tv.com, copyright the Classic TV Database—www.classic-tv.com, printed Feb. 7, 2007, 3 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"last.fm the social music revolution," 1 page, May 2007.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Welcome to the MUSICMATCH Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.

(56) References Cited

OTHER PUBLICATIONS

"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—Free," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"UpTo11.net—Music Recommendations and Search," http://www.upto11.net/, copyright 2005-2006 Upto11.net, printed Feb. 7, 2007, 1 page.
"Webjay—Playlist Community," http://www.webjay.org/, copyright 2006 Yahoo! Inc., printed Feb. 7, 2007, 5 pages.
"Wired News:," http://www.wired.com/news/digiwoo/1,57634-0.html, copyright 2005 Lycos, Inc., printed Oct. 9, 2006, 3 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
Gonze, Lucas, "A survey of playlist formats," at <http://gonze.com/playlists/playlist-format-survey.html>, Nov. 17, 2003, printed Dec. 7, 2008, 22 pages.
"Acoustic fingerprint," at <http://en.wikipedia.org/wiki/Acoustic_fingerprint>, last modified Jun. 20, 2009, printed Jul. 3, 2009, 3 pages.
"Apple—iTunes—Music Store," at <http://www.apple.com/itunes/store/>, Mar. 5, 2005, copyright 2005, Apple Computer, Inc., printed Dec. 7 2008, 3 pages.
Caputo, Rocco, "CDDB.pm—a high-level interface to the Internet Compact Disc Database," at <http://www.mathematik.uni-ulm.de/help/per15/doc-5.005_CDDB.html>, copyright 1998, Rocco Caputo; printed Jul. 3, 2009, 6 pages.
"Discover music with a little help from the fans," at <http://www.last.fm/tour/discover/>, copyright 2002-2007, Last.fm Ltd., printed Oct. 4, 2007, 1 page.
"Mp3 tag editor—Tag&Rename," at <http://www.softpointer.com/tr.htm>, copyright 1999-2007, Softpointer Inc., printed May 17, 2007, 2 pages.
"Share your music taste," at <http://www.last.fm/tour/share/>, copyright 2002-2007, Last.fm Ltd., printed Oct. 4, 2007, 1 page.
"Start listening with Last.fm . . . and get a station with music you'll like," at <http://www.last.fm/>, copyright 2002-2007, Last.fm Ltd., printed Oct. 4, 2007, 2 pages.
"The Mp3/Tag Studio Homepage," at <http://www.magnusbrading.com/mp3ts/>, earliest posts in Forum are from 2002, printed May 17, 2007, 1 page.
Bowden, Tony, "Understanding Nothing—The Music Database: Prehistory," Jun. 25, 2002, at <http://nothing.tmtm.com/archives/tag/mdb/page/2>, printed Jul. 3, 2009, 6 pages.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
Jun Wang et al., "Music Recommender System for Wi-Fi Walkman," Delft University of Technology, 23 pages, 2007.
GenieLab.com grants music lovers' wishes, http://barometer.orst.edu/home/index.cfm?event=displayArticlePrinterFriendly&uStory_id=5c420acf-a1fb-448c-8ffd-39ec5c448b6f, Mar. 2005.
That canadian girl blog archive—GenieLab, http://www.thatcanadiangirl.co.uk/blog/2005102/22/genielab/, Feb. 2005.
Digital Tech Life Download of the Week, http://www.digitaltechlife.com/category/download-of-the-week/ Archives back to Sep. 2011.
Music Recommendations 1.0, http://www.macupdate.com/info.php/id/19575, Oct. 2005.

\* cited by examiner

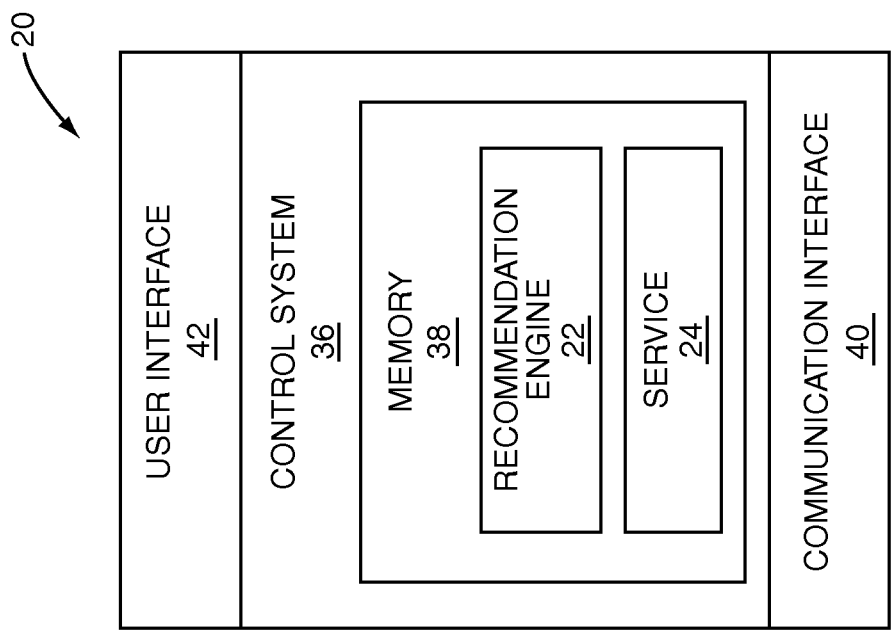
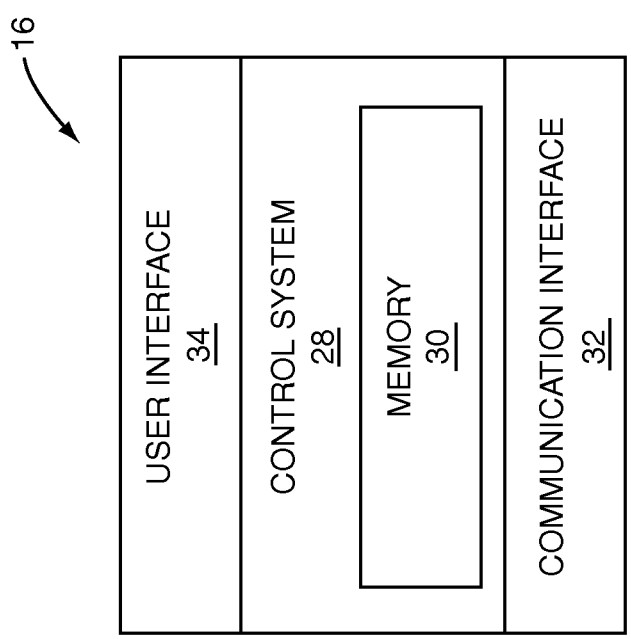

HEAVY INFLUENCER MEDIA RECOMMENDATIONS

FIELD OF THE INVENTION

The present invention relates to media recommendations, such as music recommendations, and more particularly relates to a media recommendation service for providing media recommendations to users based on media presentations recently played by heavy influencers such as, for example, celebrities.

BACKGROUND OF THE INVENTION

Due to the size of the music collections of many users and particularly with the advent of subscription based music services providing unlimited access to millions of songs, recommendation technologies are emerging as an important enabler in assisting users to identify and navigate large databases of available music. Social networks provide an important environment for mining music recommendations. Recent studies have shown that peer pressure has as much to do with what users listen to as personal preferences. However, not all peers are equal. Celebrities, for example, display a disproportionate influence in setting trends in terms of what is popular. Applying this principle to music recommendations, there is a need for a system and method that provides media recommendations, such as music recommendations, based on the media presentations recently played by "heavy influencers" such as celebrities.

SUMMARY OF THE INVENTION

The present invention provides a system and method for providing media recommendations, such as music recommendations, based on information identifying media recently played by a select group of heavy influencers for a subscription fee. The group of heavy influencers may be a group of one or more celebrities or other persons whose media selections may heavily influence media selections of the users of the system.

In general, a user of a client media player registers with a central server and selects a desired group of heavy influencers. Media players associated with the desired group of heavy influencers provide information identifying media recently played by the media players to the central server. Preferably, each media player provides information identifying media presentations played by the media player as the media presentations are played by the media player. In one embodiment, the central server then selects one of the media presentations recently played by the desired group of heavy influencers as a recommendation for the user of the client media player either automatically or in response to a request from the client media player and provides the recommendation to the client media player. The recommendation may include information identifying the recommended media presentation and optionally a Uniform Resource Locator (URL) enabling the client media player to obtain the recommended media presentation, a preview of the recommended media presentation, or the recommended media presentation.

In another embodiment, the central server provides the information identifying the media presentations recently played by the media players associated with the group of heavy influencers to the client media player either automatically or in response to a request from the client media player. The client media player then selects a recommendation from the identified media presentations and optionally one or more locally stored media presentations.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 8 is a block diagram of the client media player of FIG. 1 according to one embodiment of the present invention;

FIG. 9 is a block diagram of the central server of FIG. 1 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
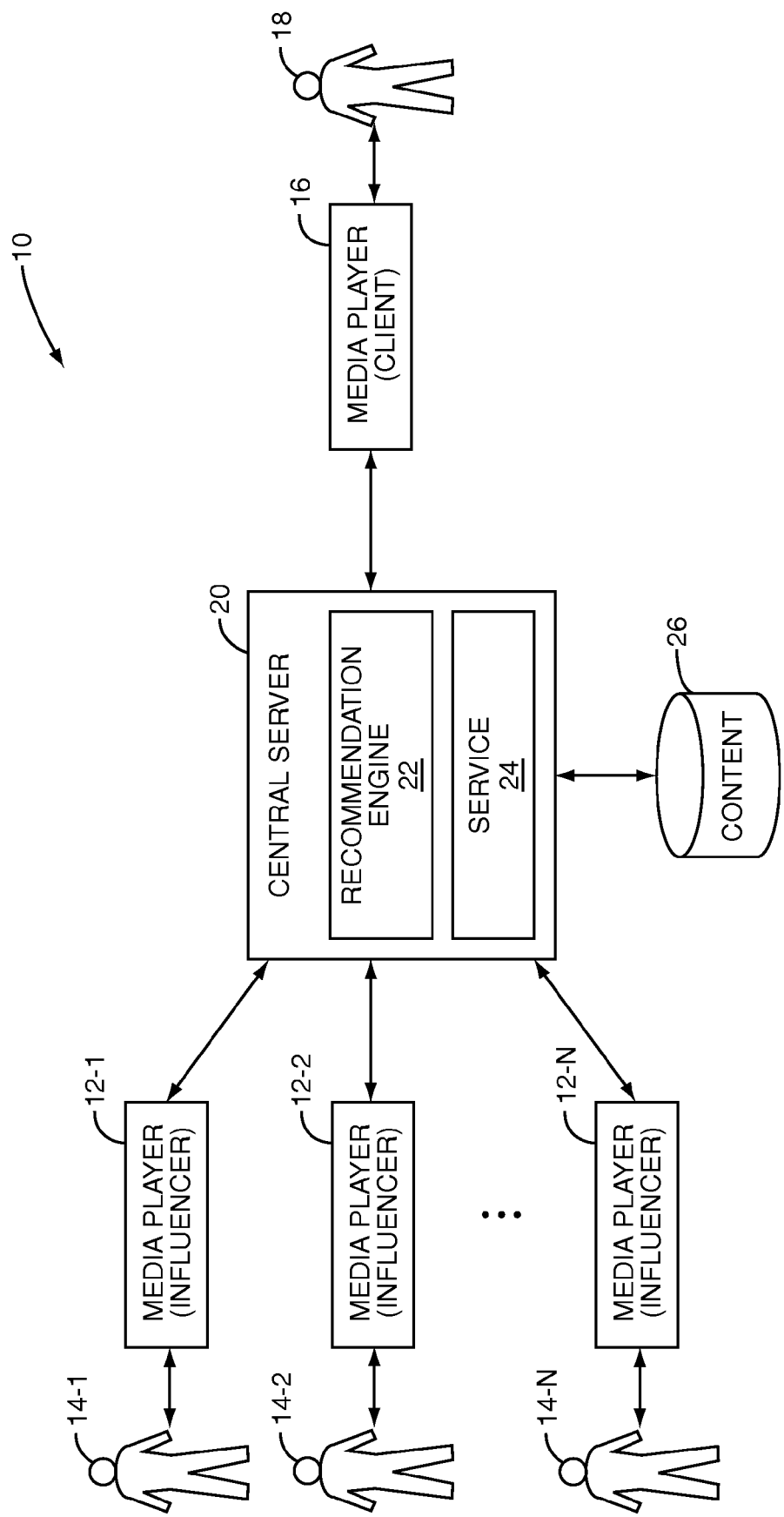
FIG. 1 illustrates a system providing media recommendations based on information identifying media presentations recently played by a group of heavy influencers according to one embodiment of the present invention.

FIG. 1 illustrates a system providing media recommendations based on information identifying media presentations recently played by a group of heavy influencers according to one embodiment of the present invention. The media recommendations are preferably provided for a subscription fee. In general, the system 10 includes a number of media players 12-1 through 12-N associated with a number of heavy influencers 14-1 through 14-N and a media player 16 having an associated user 18. The media players 12-1 through 12-N and the media player 16 are connected to a central server 20 via a network, which may be a Wide Area Network (WAN) such as, for example, the Internet, a Local Area Network (LAN), or a combination thereof. The media player 16 is hereafter referred to as a client media player 16. The heavy influencers 14-1 through 14-N are celebrities or other persons whose media selections may heavily influence media selections made by other persons such as the user 18 of the client media player 16.

Each of the media players 12-1 through 12-N and the client media player 16 may generally be any device having media playback capabilities and a network connection to the central server 20. For example, each of the media players 12-1 through 12-N and the client media player 16 may be a personal computer, a portable media player such as an Apple iPod or MusicGremlin media player, a mobile telephone, a Personal Digital Assistant (PDA), or the like having media playback capabilities and a network connection to the central server 20. Alternatively, the media players 12-1 through 12-N and the client media player 16 may be implemented in software operating on a device having a network connection to the central server 20.

The central server 20 includes a recommendation engine 22 and a service 24. The recommendation engine 22 may be implemented in software, hardware, or a combination of software and hardware. As discussed below, the recommendation engine 22 operates to provide media recommendations to the client media player 16 based on media identification information received from the media players 12-1 through 12-N associated with the heavy influencers 14-1 through 14-N. The media identification information identifies media presentations recently played by the media players 12-1 through 12-N. The media presentations are preferably songs. However, the present invention is equally applicable to other types of media presentations such as, for example, movies, television programs, and the like or any combination of songs, movies, television programs, or the like.

The service 24 may be implemented in software, hardware, or combination of software and hardware. The service 24 is either a subscription based media service providing access to media presentations in an associated media content database 26 for a subscription fee or an e-commerce service enabling purchase and download of media presentations from the media content database 26. Exemplary subscription based media services are Yahoo! Unlimited and Real Network's Rhapsody music services. An exemplary e-commerce service is Apple's iTunes music service. The service 24 may either stream or download media presentations to requesting nodes such as the client media player 16.

The media content database 26 may be stored within or in association with the central server 20. The media content database 26 may be a single database or a number of distributed databases and operates to store a number of media presentations accessible to the service 24. The media presentations are preferably songs. However, the media presentations may be songs, movies, television programs, or the like or any combination thereof.

Figure 2:
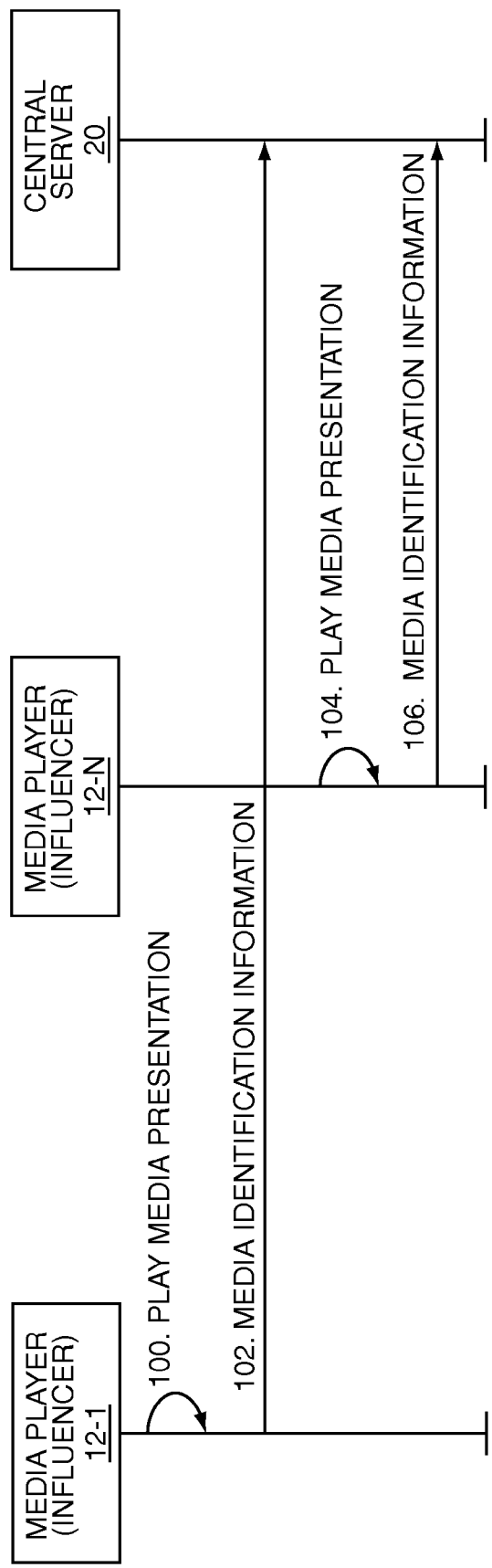
FIG. 2 illustrates the operation of the media players associated with a group of heavy influencers and the central server of FIG. 1, wherein the media players provide media identification information identifying media presentations played by the media players to the central server according to one embodiment of the present invention.

FIG. 2 illustrates the operation of the media players 12-1 through 12-N associated with the heavy influencers 14-1 through 14-N of FIG. 1. While FIG. 2 shows only the media players 12-1 and 12-N, this discussion is equally applicable to all of the media players 12-1 through 12-N. In general, the media player 12-1 plays a media presentation (step 100). In response, the media player 12-1 provides media identification information identifying the media presentation to the central server 20 (step 102). Preferably, the media player 12-1 provides the media identification information to the central server 20 in real time either when the media presentation is selected for playback, during playback of the media presentation, or at the conclusion of playback of the media presentation.

The media identification information may generally be any information identifying the media presentation played by the media player 12-1. For example, if the media presentation is a song, the media identification information may be a Globally Unique Identifier (GUID) for the song or a title of the song combined with some other information such as an artist of the song, an album on which the song was released, a date of release, or the like. As another example, if the media presentation is a video such as a movie or television program, the media identification information may be a GUID for the video or a title of the video combined with some other information such as a date of release of the video, the names of one or more actors or actresses in the video, or the like. In addition or alternatively, the media identification information may include one or more fingerprints of the media presentation or one or more samples of the media presentation enabling the central server 20 to identify the media presentation or to validate the identity of the media presentation in a manner similar to that disclosed in U.S. patent application Ser. No. 11/392,051, entitled SYSTEM AND METHOD FOR ARCHIVING A MEDIA COLLECTION, which was filed Mar. 29, 2006 and is hereby incorporated herein by reference in its entirety. The media identification information may also include a timestamp indicating the time at which the identified media presentation was played at the media player 12-1.

Likewise, the media player 12-N plays a media presentation (step 104) and, in response, provides media identification information identifying the media presentation to the central server 20 (step 106). The process continues such that each time either of the media players 12-1, 12-N plays a media presentation, media identification information identifying the media presentation is provided to the central server 20. As a result, the central server 20 is aware of all media presentations played by the media players 12-1, 12-N associated with the heavy influencers 14-1, 14-N. Further, the central server 20 is preferably aware of all of the media presentations played by the media players 12-1, 12-N in real-time.

It should be noted that if for any reason the network connection between the media player 12-1 or 12-N and the central server 20 is interrupted, the media player 12-1 or 12-N may optionally store the media identification information. When the network connection is re-established, the media player 12-1 or 12-N may then provide the media presentation information to the central server 20 in a batch process.

Figure 3:
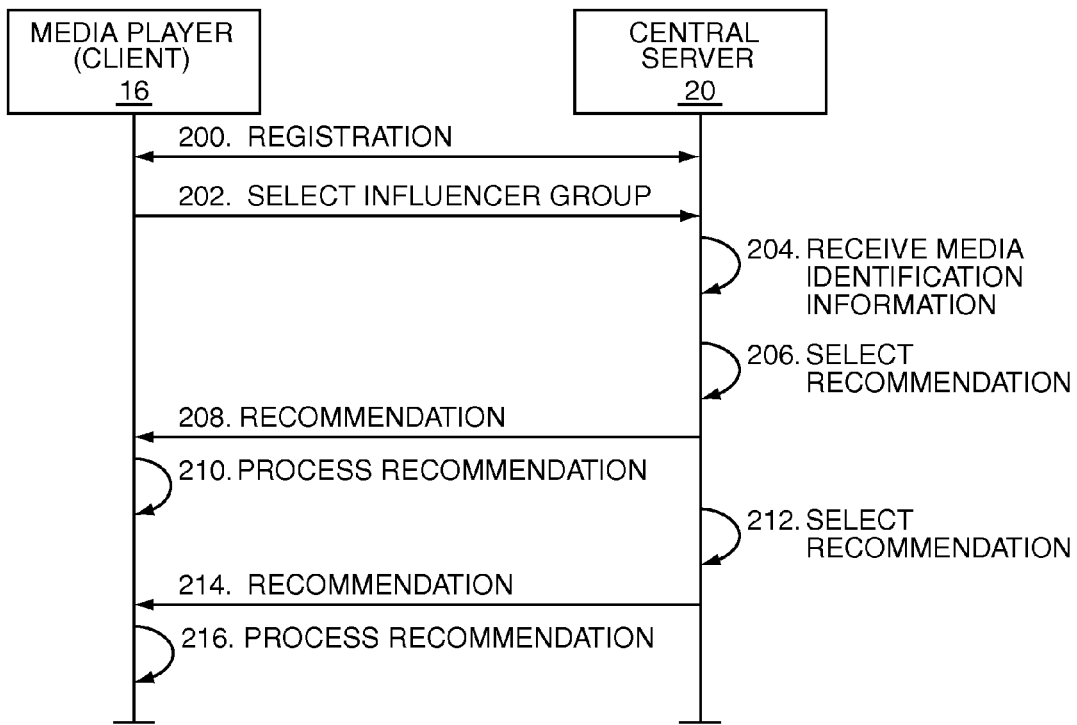
FIG. 3 illustrates the operation of the central server to provide media recommendations based on the media presentations recently played by the media players associated with the group of heavy influencers according to a first embodiment of the present invention.

FIG. 3 illustrates the operation of the central server 20 and client media player 16 of FIG. 1 to provide media recommendations according to one embodiment of the presentation invention. First, the client media player 16 registers with the central server 20 for the media recommendation service (step 200). During the registration process, the user 18 of the client media player 16 may enter information such as name, address, billing information, and user preferences. Note that the billing information may be used to bill the user 18 for a subscription fee for the media recommendation service. The user preferences may include information such as the user's favorite music genres, the user's favorite music artists, the user's favorite music albums, the user's favorite songs, the user's favorite movie genres, the user's favorite actors and actresses, the user's favorite directors, the user's favorite movies, the user's favorite television shows, and the like. The user preferences may be obtained, for example, by using a questionnaire or a ranking process where the user ranks genres, artists, etc., or a combination thereof. In addition, the user 18 may enter filtering criteria. The filtering criteria may include, for example, genres, artists, song titles, movie titles, or the like or any combination thereof that the user 18 desires to block from being recommended to the user 18.

In addition or alternatively, during the registration process, information identifying all or a portion of a number of media presentations in a media collection of the user 18 stored on the client media player 16 may be provided to the central server 20. The information identifying the media presentations in the user's media collection may be, for example, GUIDs for the media presentations or metadata associated with the media presentations. For songs, the metadata may include a title, artist, album, release date, and the like. For videos, the metadata may include a title, actors or actresses, release date, and the like. In addition or alternatively, the information identifying the media presentations may include one or more fingerprints or samples for each of the media presentations where the central server 20 may identify or confirm the identity of the media presentations based on the fingerprints or samples as, for example, discussed in previously incorporated U.S. patent application Ser. No. 11/392,051, entitled SYSTEM AND METHOD FOR ARCHIVING A MEDIA COLLECTION. The central server 20 may then analyze the information identifying the media presentations in the user's media collection to determine the user preferences for the user 18.

Next, the user 18 selects a desired group of the heavy influencers 14-1 through 14-N (step 202). In one embodiment, the user 18 individually selects one or more of the heavy influencers 14-1 through 14-N to form the desired group of heavy influencers. In another embodiment, a number of groups of the heavy influencers 14-1 through 14-N are predefined, and the user 18 selects a desired one of the number of predefined heavy influencer groups. The predefined heavy influencer groups may be, for example, the cast of a popular television program such as "Friends" or "The Sopranos," the members in a popular music group such as "Aerosmith" or "The Rolling Stones," a group of actors and actress from a popular movie such as "Pirates of the Caribbean: Dead Man's Chest," a celebrity couple such as Brad Pitt and Angelina Jolie, or the like. In this example, assume that the desired group of heavy influencers includes the heavy influencers 14-1 and 14-2.

As discussed above, the central server 20 receives media identification information from each of the media players 12-1 through 12-N associated with the heavy influencers 14-1 through 14-N (step 204). Note that while this is illustrated as a single step, it is a continual process where the central server 20 continually receives media identification information from the media players 12-1 through 12-N as media presentations are played by the media players 12-1 through 12-N.

The recommendation engine 22 of the central server 20 then selects a recommendation for the client media player 16 based on the media identification information identifying media presentations recently played by the media players 12-1 and 12-2 associated with the desired group of heavy influencers (step 206). More specifically, prior to selection of the recommended media presentation, the recommendation engine 22 may optionally filter the media identification information from the media players 12-1 and 12-2 based on the filtering criteria provided by the user 18 to remove media identification information identifying media presentations that are not to be recommended to the user 18. Based on the user preferences of the user 18 of the client media player 16, the recommendation engine 22 of the central server 20 selects one of media presentations recently played by the media players 12-1 and 12-2 associated with the desired group of heavy influencers as a recommended media presentation. In one embodiment, the recommendation engine 22 may score the media presentations recently played by the media players 12-1 and 12-2 based on the user preferences of the user 18 and then select the recommended media presentation based on the scores in a manner similar to that described in U.S. patent. application Ser. No. 11/484,130, entitled P2P NETWORK FOR PROVIDING REAL TIME MEDIA RECOMMENDATIONS, which was filed Jul. 11, 2006 and is hereby incorporated herein by reference in its entirety.

In one embodiment, the recommendation engine 22 selects the recommended media presentation from all media presentations previously played by the media players 12-1 and 12-2 associated with the desired group of heavy influencers. In this embodiment, the media identification information may optionally have an expiration period after which the media identification information may be discarded. In another embodiment, the recommendation engine 22 selects the recommended media presentation from only those media presentations identified by media identification information received since a last, or previous, recommendation was selected.

The central server 20 then provides the recommendation to the client media player 16 (step 208). The recommendation may be media identification information identifying the recommended media presentation and optionally a Uniform Resource Locator (URL) for accessing the recommended media presentation via the service 24, a preview of the recommended media presentation, or the recommended media presentation. If the recommendation is a preview of the recommended media presentation or the recommended media presentation, the service 24 of the central server 20 may stream or download the preview or media presentation to the media player 16.

Upon receiving the recommendation, the client media player 16 processes the recommendation (step 210). If the recommendation is media identification information, the client media player 16 may display or otherwise present at least a portion of the media identification information to the user 18 and enable the user to select the media presentation for playback. Assuming that the recommended media presentation is not part of the user's local media collection, if the user 18 selects the media presentation for playback, the client media player 16 then requests the media presentation from the service 24. The service 24 then either streams the media presentation to the client media player 16 or downloads the media presentation to the client media player 16. Note that if the service 24 is an e-commerce service, the user 18 may be required to purchase the media presentation prior to receiving the media presentation from the service 24.

If the recommendation is a preview, the preview is automatically streamed or downloaded to the client media player 16 for playback. At some point either during or after playback of the preview, the user 18 may instruct the client media player 16 to obtain the media presentation. In response, the client media player 16 requests the media presentation from the service 24. The service 24 then either streams the media presentation to the client media player 16 or downloads the media presentation to the client media player 16. Note that if the service 24 is an e-commerce service, the user 18 may be required to purchase the media presentation prior to receiving the media presentation from the service 24. Alternatively, the preview may be a media file including the entire media presentation and Digital Rights Management (DRM) restrictions that restrict playback to the preview until the media presentation is purchased. Once purchased, information unlocking the entire media presentation is provided to the client media player 16.

If the recommendation is the recommended media presentation, the media presentation is automatically streamed or downloaded to the client media player 16 for playback. Note that if the service 24 is an e-commerce service, the user 18 may be required to purchase the media presentation prior to receiving the media presentation from the service 24.

Preferably, in one embodiment, the client media player 16 operates in a "play-by-recommendation" mode where the central server 20 provides media recommendations to the client media player 16 in real-time as needed by the client media player 16. Thus, upon receiving the recommendation in step 208, the client media player 16 may play the recommended media presentation. Then, after the recommendation has expired, the central server 20 selects a new recommendation and provides the new recommendation to the client media player 16 (steps 212 and 214).

The recommendation may expire after a pre-set period of time such that the central server 20 provides media recommendations to the client media player 16 periodically or after a predetermined expiration time for the particular recommended media presentation. The expiration time for the particular recommended media presentation may be, for example, a play length of the recommended media presentation. Alternatively, the client media player 16 may notify the central server 20 when playback is complete or expected to be complete, where the recommendation engine 22 selects the new recommendation and provides the new recommendation to the client media player 16 in response to the notification.

It should be noted that if, for example, the user 18 instructs the client media player 16 to skip, or go, to the next media presentation before playback of the recommended media presentation or during playback of the recommended media presentation, the client media player 16 may optionally notify the central server 20. In response, the central server 20 may then select the new recommendation and provide the new recommendation to the client media player 16.

Once the new recommendation is received by the client media player 16, the client media player 16 processes the recommendation as described above (step 216). The process may continue indefinitely such that media recommendations continue to be provided to and processed by the client media player 16.

Figure 4:
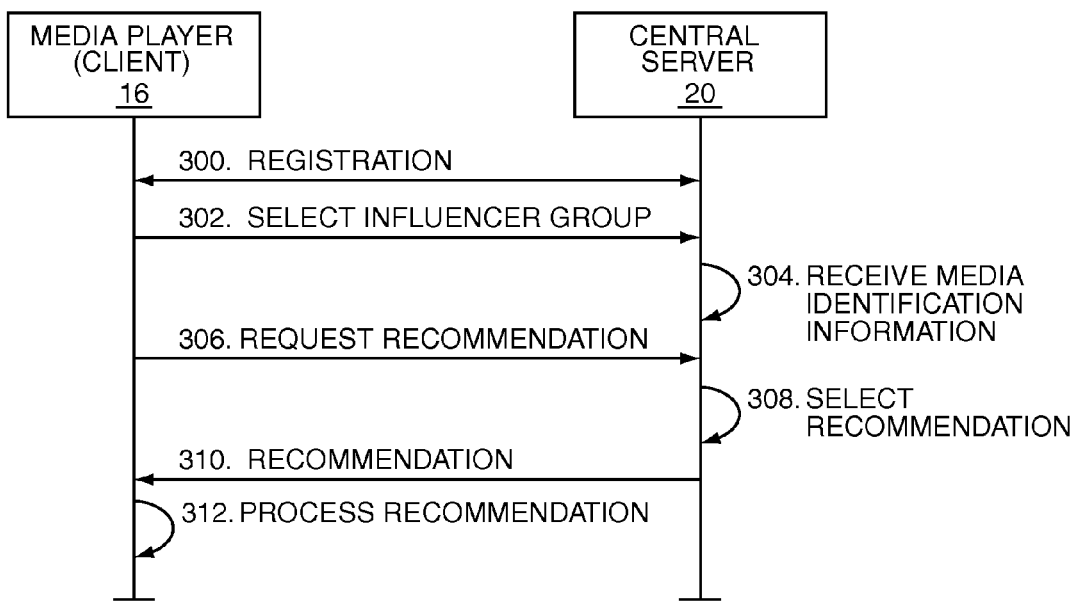
FIG. 4 illustrates the operation of the central server to provide media recommendations based on the media presentations recently played by the media players associated with the group of heavy influencers according to a second embodiment of the present invention.

FIG. 4 illustrates the operation of the central server 20 and client media player 16 of FIG. 1 to provide media recommendations according to another embodiment of the presentation invention. In this embodiment, the central server 20 provides media recommendations to the client media player 16 upon request. First, the user 18 registers with the central server 20 and selects a desired group of heavy influencers, as described above (steps 300 and 302).

The central server 20 receives media identification information from each of the media players 12-1 through 12-N associated with the heavy influencers 14-1 through 14-N (step 304). Note that while this is illustrated as a single step, it is a continual process where the central server 20 continually receives media identification information from the media players 12-1 through 12-N as media presentations are played by the media players 12-1 through 12-N.

The client media player 16 then sends a request for a recommendation to the central server 20 (step 306). In response, the recommendation engine 22 of the central server 20 selects a recommendation based on the media identification information identifying media presentations recently played by the media players associated with the desired group of heavy influencers (step 308). More specifically, prior to selection of the recommended media presentation, the recommendation engine 22 may optionally filter the media identification information from the media players associated with the desired group of heavy influencers based on the filtering criteria provided by the user 18 to remove media identification information identifying media presentations that are not to be recommended to the user 18. Based on the user preferences of the user 18 of the client media player 16, the recommendation engine 22 of the central server 20 selects one of media presentations recently played by the media players associated with the desired group of heavy influencers as a recommended media presentation. In one embodiment, the recommendation engine 22 may score the media presentations recently played by the media players associated with the desired group of heavy influencers based on the user preferences of the user 18 and then select the recommended media presentation based on the scores.

In one embodiment, the recommendation engine 22 selects the recommended media presentation from all media presentations previously played by the media players associated with the desired heavy influencer group. In this embodiment, the media identification information may optionally have an expiration period after which the media identification information may be discarded. In another embodiment, the recommendation engine 22 selects the recommended media presentation from only those media presentations identified by media identification information received since a last, or previous, recommendation was selected.

The recommendation is then provided to the client media player 16 (step 310). The recommendation may be media identification information identifying the recommended media presentation and optionally a URL for accessing the recommended media presentation via the service 24, a preview of the recommended media presentation, or the recommended media presentation. If the recommendation is a preview of the recommended media presentation or the recommended media presentation, the service 24 of the central server 20 may stream or download the preview or media presentation to the client media player 16.

Upon receiving the recommendation, the client media player 16 processes the recommendation (step 312). If the recommendation is media identification information, the client media player 16 may display or otherwise present at least a portion of the media identification information to the user 18 and enable the user to select the media presentation for playback. Assuming that the recommended media presentation is not part of the user's local media collection, if the user 18 selects the media presentation for playback, the client media player 16 then requests the media presentation from the service 24. The service 24 then either streams the media presentation to the client media player 16 or downloads the media presentation to the client media player 16. Note that if the service 24 is an e-commerce service, the user 18 may be required to purchase the media presentation prior to receiving the media presentation from the service 24.

If the recommendation is a preview, the preview is automatically streamed or downloaded to the client media player 16 for playback. At some point either during or after playback of the preview, the user 18 may instruct the client media player 16 to obtain the media presentation. In response, the client media player 16 requests the media presentation from the service 24. The service 24 then either streams the media presentation to the client media player 16 or downloads the media presentation to the client media player 16. Note that if the service 24 is an e-commerce service, the user 18 may be required to purchase the media presentation prior to receiving the media presentation from the service 24. Alternatively, the preview may be a media file including the entire media presentation and DRM restrictions that restrict playback to the preview until the media presentation is purchased. Once purchased, information unlocking the entire media presentation is provided to the client media player 16.

If the recommendation is the recommended media presentation, the media presentation is automatically streamed or downloaded to the client media player 16 for playback. Note that if the service 24 is an e-commerce service, the user 18 may be required to purchase the media presentation prior to receiving the media presentation from the service 24.

Figure 5:
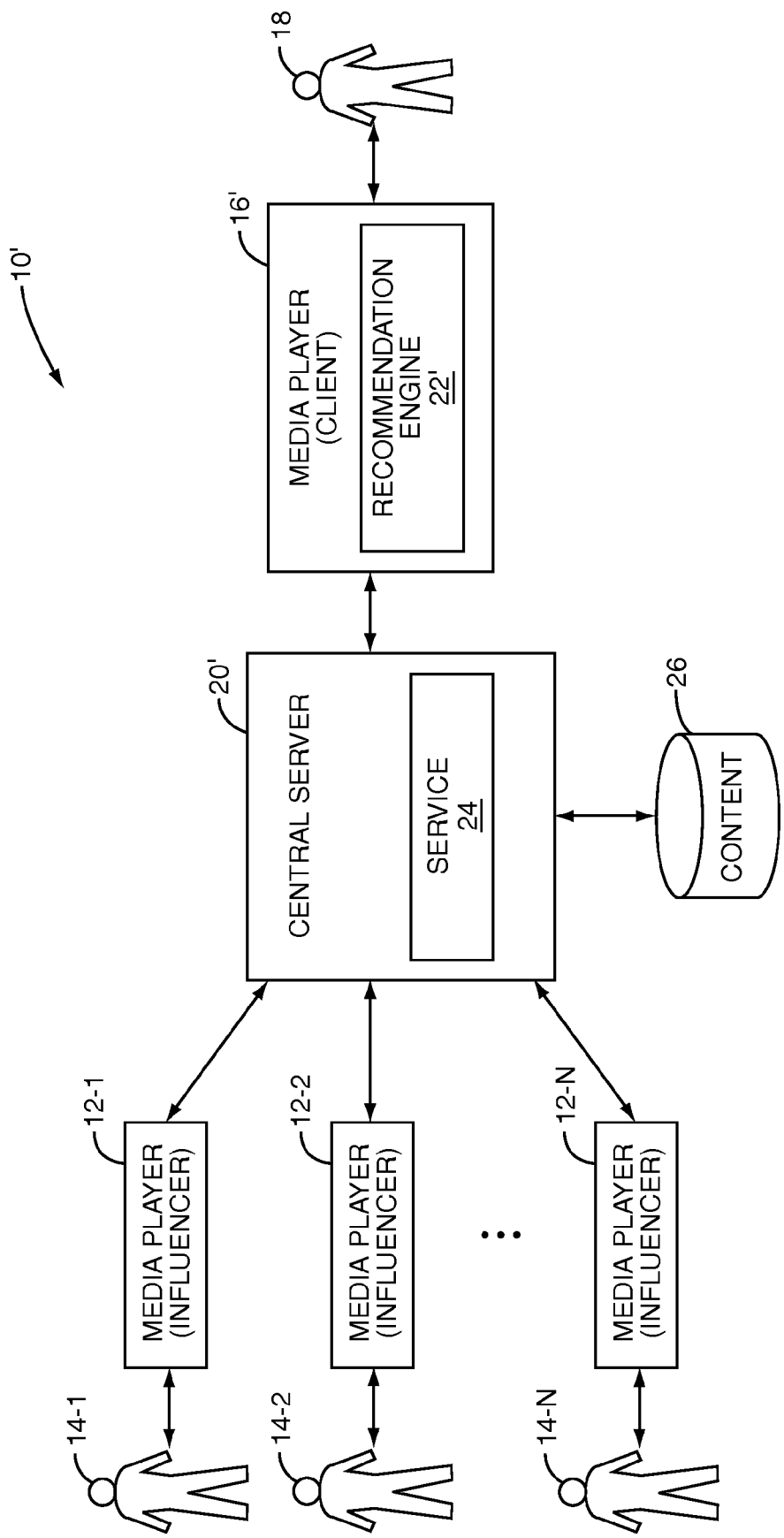
FIG. 5 illustrates a system providing media recommendations based on information identifying media presentations recently played by a group of heavy influencers according to another embodiment of the present invention.

FIG. 5 is similar to FIG. 1 and illustrates a system 10' providing media recommendations based on information identifying media presentations recently played by a group of heavy influencers according to a second embodiment of the present invention. In this embodiment, the recommendation is generated at the client media player 16 rather than at the central server 20. More specifically, the system 10' includes the media players 12-1 through 12-N associated with the heavy influencers 14-1 through 14-N, the client media player 16' associated with the user 18, and the central server 20'. However, in this embodiment, the recommendation engine 22' is hosted by the client media player 16' rather than the central server 20'.

Figure 6:
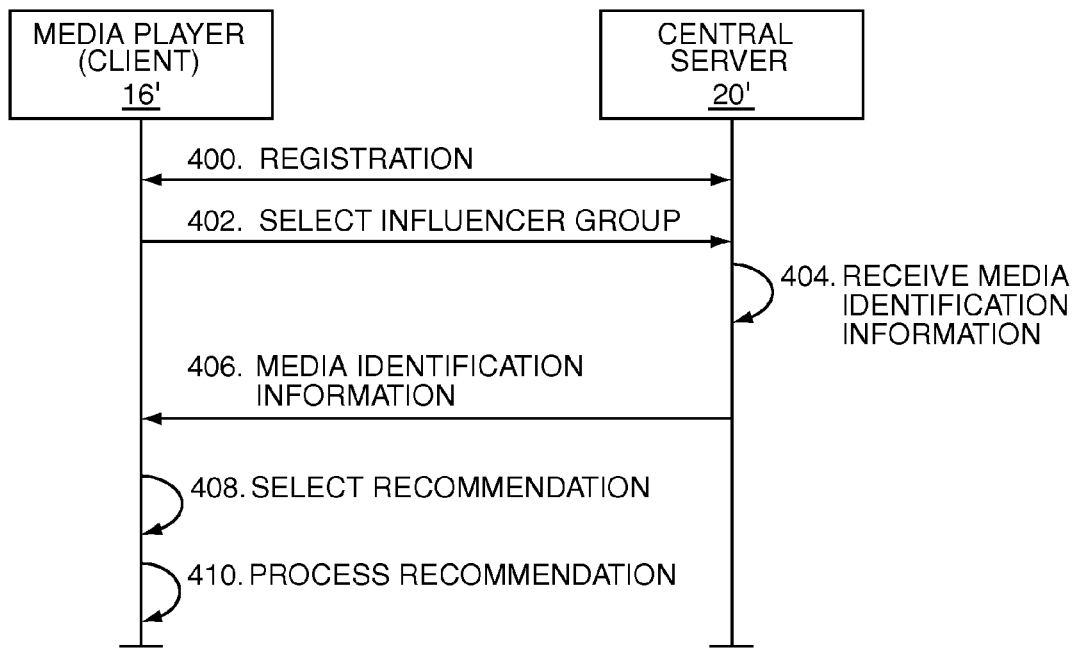
FIG. 6 illustrates the operation of the system of FIG. 5 according to a first embodiment of the present invention.

FIG. 6 illustrates the operation of the central server 20' and the client media player 16' of FIG. 5 according to one embodiment of the present invention. First, the user 18 registers with the central server 20' and selects a desired group of heavy influencers (steps 400 and 402). During the registration process, the user 18 of the client media player 16' may be required to enter information such as name, address, billing information, and user preferences. Note that the billing information is preferably required because the media recommendation service is preferably provided for a subscription fee.

In addition, at some point, which may be during registration, the user 18 may provide user preferences to the recommendation engine 22' of the client media player 16' or the recommendation engine 22' may infer the user preferences from a locally stored media collection. The user preferences may include information such as the user's favorite music genres, the user's favorite music artists, the user's favorite music albums, the user's favorite songs, the user's favorite movie genres, the user's favorite actors and actresses, the user's favorite directors, the user's favorite movies, the user's favorite television shows, and the like. The user may also provide filtering criteria.

As discussed above with respect to FIG. 2, the central server 20' receives media identification information from each of the media players 12-1 through 12-N associated with the heavy influencers 14-1 through 14-N (step 404). Note that while this is illustrated as a single step, it is a continual process where the central server 20' continually receives media identification information from the media players 12-1 through 12-N as media presentations are played by the media players 12-1 through 12-N.

The central server 20' may then provide the media identification information from the media players associated with the desired group of heavy influencers to the client media player 16' (step 406). The media identification information may be provided to the client media player 16 in real time as the media identification information is received from the media players associated with the desired group of heavy influencers or provided periodically in a batch process. Then, either automatically or at the request of the user 18, the recommendation engine 22' selects a recommendation from the media presentations identified by the media identification information and optionally one or more locally stored media presentations (step 408). The selection is preferably based on the user preferences of the user 18. Prior to selection of the recommendation, the recommendation engine 22' may filter the media identification information based on the filtering criteria provided by the user 18 to remove media identification information identifying media presentations that are not to be recommended to the user 18. For more information regarding an exemplary selection process, the interested reader is referred to U.S. patent application Ser. No. 11/484, 130, entitled P2P NETWORK FOR PROVIDING REAL TIME MEDIA RECOMMENDATIONS, which was filed Jul. 11, 2006 and has been incorporated herein by reference in its entirety.

Once the recommendation is selected, the client media player 16' processes the recommendation (step 410). In this embodiment, the recommendation is media identification information identifying a recommended media presentation. The client media player 16' may display or otherwise present at least a portion of the media identification information to the user 18 and enable the user to select the media presentation or a preview of the media presentation for playback. If the user 18 selects the media presentation for playback, the client media player 16' then requests the media presentation from the service 24. The service 24 then either streams the media presentation to the client media player 16 or downloads the media presentation to the client media player 16'. Note that if the service 24 is an e-commerce service, the user 18 may be required to purchase the media presentation prior to receiving the media presentation from the service 24.

If the user 18 instructs the client media player 16' to obtain a preview of the recommended media presentation, the client media player 16' requests the preview from the service 24. The service 24 then either streams or downloads the preview to the client media player 16' for playback. At some point either during or after playback of the preview, the user 18 may instruct the client media player 16' to obtain the media presentation. In response, the client media player 16' requests the media presentation from the service 24. The service 24 then either streams the media presentation to the client media player 16' or downloads the media presentation to the client media player 16'. Note that if the service 24 is an e-commerce service, the user 18 may be required to purchase the media presentation prior to receiving the media presentation from the service 24. Alternatively, the preview may be a media file including the entire media presentation and DRM restrictions that restrict playback to the preview until the media presentation is purchased. Once purchased, information unlocking the entire media presentation is provided to the client media player 16'.

Figure 7:
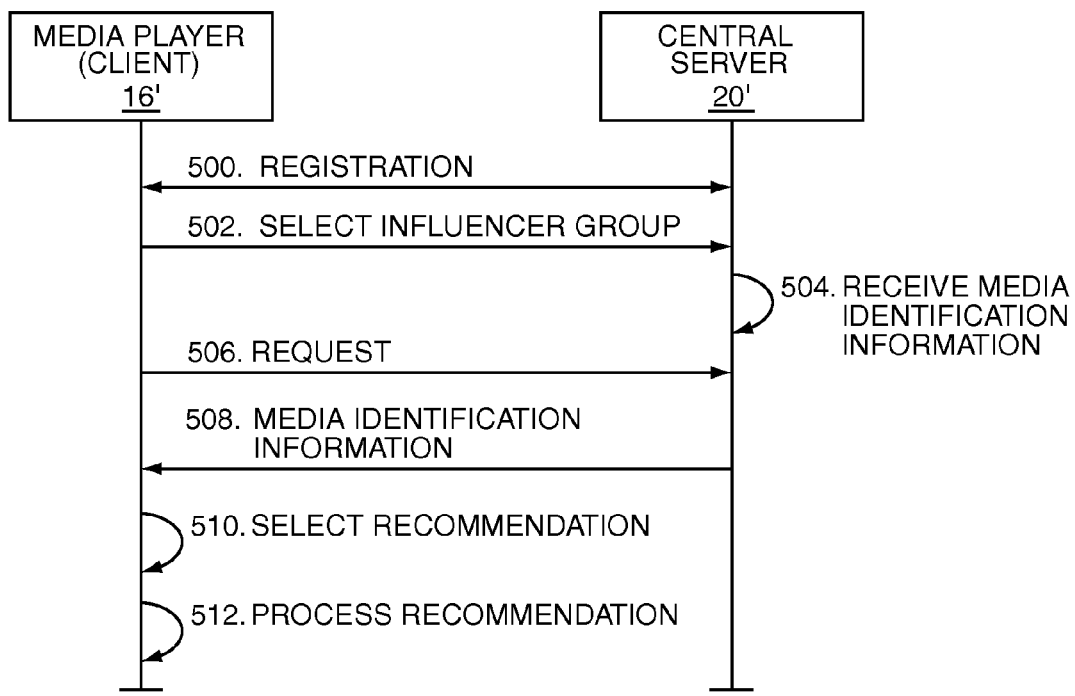
FIG. 7 illustrates the operation of the system of FIG. 5 according to a second embodiment of the present invention.

FIG. 7 is substantially the same as FIG. 6. However, in this embodiment, the media identification information is provided to the client media player 16' upon request. More specifically, the user 18 first registers with the central server 20' and selects a desired group of heavy influencers, as described above with respect to FIG. 6 (steps 500 and 502). As discussed above with respect to FIG. 2, the central server 20' receives media identification information from each of the media players 12-1 through 12-N associated with the heavy influencers 14-1 through 14-N (step 504).

When a recommendation is desired, the client media player 16' requests the media identification from the media players associated with the desired group of heavy influencers from the central server 20' (step 506). In response, the central server 20' provides the requested media identification information (step 508). Then, the recommendation engine 22' selects a recommendation from the media presentations identified by the media identification information and optionally one or more locally stored media presentations (step 510). The selection is preferably based on the user preferences of the user 18. Once the recommendation is selected, the client media player 16' processes the recommendation, as described above with respect to step 410 of FIG. 6 (step 512).

FIG. 8 is a block diagram of the client media player 16 of FIG. 1 according to one embodiment of the present invention. In general, the client media player 16 includes a control system 28 having associated memory 30. The memory 30 may store software instructing the client media player 16 to operate according to the present invention. The client media player 16 also includes a communication interface 32 communicatively coupling the client media player 16 to the central server 20. For example, the communication interface 32 may provide a wired network connection or a wireless network connection. The wireless network connection may be, for example, a wireless network connection operating according to one of the suite of IEEE 802.11 standards, a cellular communication standard, or the like. The client media player 16 also includes a user interface 34 which may include components such as, for example, a display, speakers, one or more user input devices, and the like.

FIG. 9 is a block diagram of the central server 20 of FIG. 1 according to one embodiment of the present invention. In general, the central server 20 includes a control system 36 having associated memory 38. In this example, the recommendation engine 22 and the service 24 are implemented at least partially in software and stored in the memory 38. However, the present invention is not limited thereto. The central server 20 also includes a communication interface 40 communicatively coupling the central server 20 to the media players 12-1 through 12-N associated with the heavy influencers 14-1 through 14-N and the client media player 16. The central server 20 may also include a user interface 42 which may include components such as, for example, a display, speakers, one or more user input devices, and the like.

Figure 10:
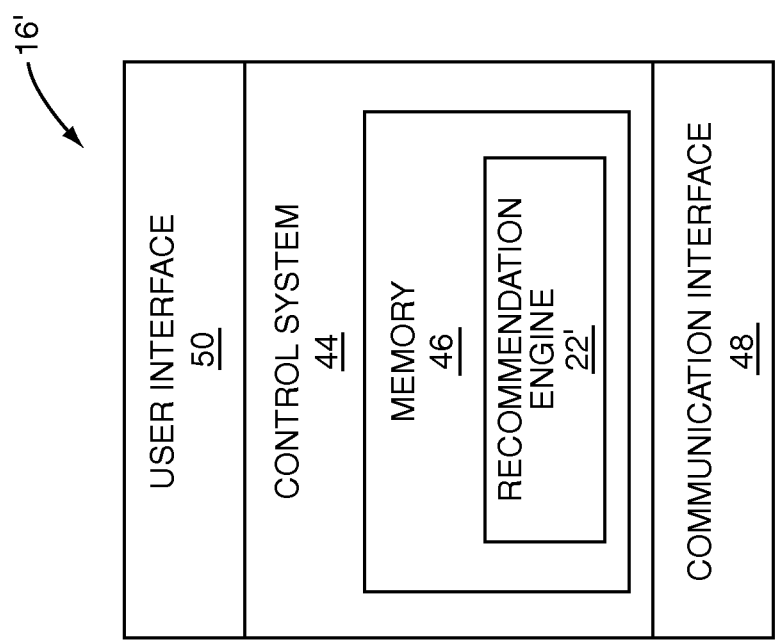
FIG. 10 is a block diagram of the client media player of FIG. 5 according to one embodiment of the present invention.

FIG. 10 is a block diagram of the client media player 16' of FIG. 5 according to one embodiment of the present invention. In general, the client media player 16' includes a control system 44 having associated memory 46. In this example, the recommendation engine 22' is implemented at least partially in software and stored in the memory 46. However, the present invention is not limited thereto. The client media player 16' also includes a communication interface 48 communicatively coupling the client media player 16' to the central server 20'. For example, the communication interface 48 may provide a wired network connection or a wireless network connection. The client media player 16' also includes a user interface 50 which may include components such as, for example, a display, speakers, one or more user input devices, and the like.

Figure 11:
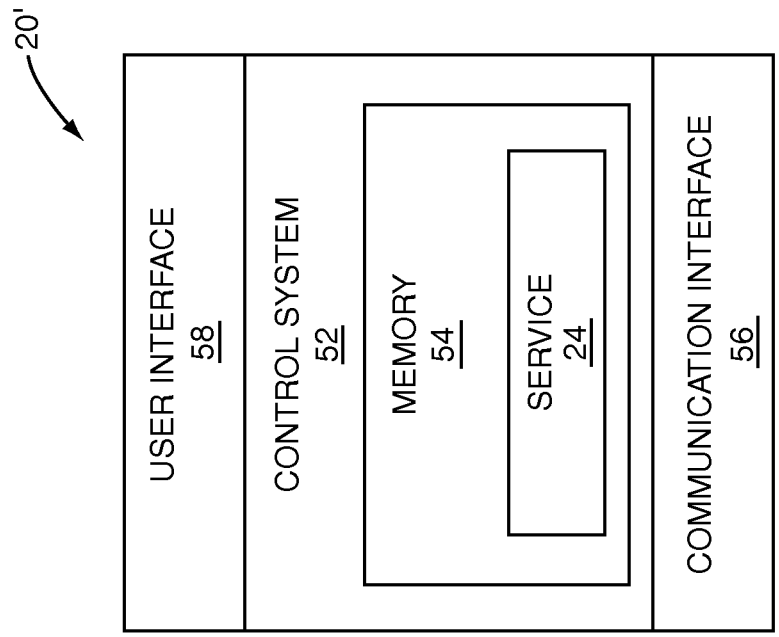
FIG. 11 is a block diagram of the central server of FIG. 5 according to one embodiment of the present invention.

FIG. 11 is a block diagram of the central server 20' of FIG. 5 according to one embodiment of the present invention. In general, the central server 20' includes a control system 52 having associated memory 54. In this example, the service 24 is implemented at least partially in software and stored in the memory 54. However, the present invention is not limited thereto. The central server 20' also includes a communication interface 56 communicatively coupling the central server 20' to the media players 12-1 through 12-N associated with the heavy influencers 14-1 through 14-N and the client media player 16'. The central server 20' may also include a user interface 58 which may include components such as, for example, a display, speakers, one or more user input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A method of operating a central server to provide media recommendations to a client media player of a user, comprising:

obtaining a user selection of one or more heavy influencers, the user selection based upon input from the user of the client media player;

determining user preferences and filter criteria associated with the user of the client media player;

receiving, from media players associated with the one or more heavy influencers, media identification information identifying one or more media presentations in response to the one or more media presentations being played by the media players associated with the one or more heavy influencers, each of the one or more media presentations being a song or a video;

filtering the media identification information based on the filter criteria to remove media identification information identifying media presentations that are not to be recommended;

after filtering the media identification information, the central server selecting a first recommended media presentation from the one or more media presentations played by the media players associated with the one or more heavy influencers based on the user preferences;

after selecting the first recommended media presentation, providing a first recommendation for the first recommended media presentation to the client media player of the user;

receiving, from the media players associated with the one or more heavy influencers, second media identification information identifying one or more second media presentations in response to the one or more second media presentations being subsequently played by the media players associated with the one or more heavy influencers, each of the one or more second media presentations being a song or a video;

filtering the second media identification information based on the filter criteria to remove second media identification information identifying second media presentations that are not to be recommended;

after filtering the second media identification information, the central server selecting a second recommended media presentation from the second media presentations identified by the second media identification information based on the user preferences; and after selecting the second recommended media presentation, providing a second recommendation for the second recommended media presentation to the client media player of the user.

2. The method of claim 1 obtaining the user selection of the one or more heavy influencers comprises obtaining one or more individually selected heavy influencers as the user selection.

3. The method of claim 1 wherein obtaining the user selection of the one or more heavy influencers comprises obtaining one or more selected predefined groups of heavy influencers as the user selection.

4. The method of claim 1 wherein each of the one or more heavy influencers is a person having substantial influence over media presentations played by other persons.

5. The method of claim 1 wherein each of the of one or more heavy influencers is a celebrity.

6. The method of claim 1 wherein receiving the media identification information comprises receiving the media identification information in substantially real time as the one or more media presentations identified by the media identification information are played by the media players associated with the one or more heavy influencers.

7. The method of claim 1 wherein the central server is communicatively coupled to the media players associated with the one or more heavy influencers via a network, receiving the media identification information comprises receiving the media identification information at the central server, and selecting the first recommended media presentation comprises selecting the first recommended media presentation at the central server.

8. The method of claim 7 wherein the client media player is communicatively coupled to the central server via the network, and the first recommended media presentation is selected and the first recommendation for the first recommended media presentation is provided to the client media player for a subscription fee.

9. The method of claim 1 wherein the first recommendation comprises information identifying the first recommended media presentation.

10. The method of claim 1 wherein providing the first recommendation comprises automatically providing the first recommendation to the client media player once a previous recommendation has expired.

11. The method of claim 1 wherein providing the first recommendation comprises providing the first recommendation to the client media player upon request.

12. The method of claim 1 wherein the first recommendation comprises a preview of the first recommended media presentation.

13. The method of claim 1 wherein the first recommendation comprises the first recommended media presentation.

14. The method of claim 1 wherein selecting the first and second recommended media presentations comprises identifying media presentations stored on the client media player of the user and filtering the media identification information and second media identification information based on the media presentations stored on the client media player of the user.

15. The method of claim 1 wherein selecting the first and second recommended media presentations comprises selecting the first and second recommended media presentations without identifying media presentations stored on the client media player of the user.

16. The method of claim 1 wherein selecting the first and second recommended media presentations comprises selecting the first and second recommended media presentations based on media identification information from only the media players of the one or more heavy influencers.

17. The method of claim 1 wherein providing the second recommendation to the client media player comprises providing the second recommendation to the client media player prior to the client media player completing playback of the first recommended media presentation corresponding to the first recommendation.

18. The method of claim 1 wherein the second media identification information corresponds to the one or more second media presentations played by the media players associated with the one or more heavy influencers at a time later than the first recommended media presentation was selected.

19. The method of claim 1 wherein the first recommended media presentation corresponds to the last media item played by the media players associated with the one or more heavy influencers at a time of selection of the first recommended media presentation.

20. The method of claim 19 wherein the second recommended media presentation corresponds to the next media item played by the media players associated with the one or more heavy influencers after the first recommended media presentation was played by the media players associated with the one or more heavy influencers.

21. The method of claim 1 wherein the one or more media presentations played by the media players associated with the one or more heavy influencers are played by the media players associated with the one or more heavy influencers without influence from the first or second recommendation.

22. A method of operating a central server to provide media recommendations to a client media player of a user, comprising:

obtaining a user selection of one or more heavy influencers, the user selection based upon input from the user of the client media player;

determining user preferences and filter criteria associated with the user of the client media player;

receiving, from media players associated with the one or more heavy influencers, media identification information identifying one or more media presentations in response to the one or more media presentations being played by the media players associated with the one or more heavy influencers, each of the one or more media presentations being a song or a video;

filtering the media identification information based on the filter criteria to remove media identification information identifying media presentations that are not to be recommended;

after filtering the media identification information, the central server selecting a first recommended media presentation from the one or more media presentations played by the media players associated with the one or more heavy influencers based on the user preferences;

after selecting the first recommended media presentation, providing a first recommendation for the first recommended media presentation to the client media player of the user;

receiving, from the media players associated with the one or more heavy influencers, second media identification information identifying one or more second media presentations in response to the one or more second media presentations being played by the media players associated with the one or more heavy influencers, each of the one or more second media presentations being a song or a video;

filtering the second media identification information based on the filter criteria to remove second media identification information identifying second media presentations that are not to be recommended;

after filtering the second media identification information, the central server selecting a second recommended media presentation from a plurality of media presentations comprising the one or more media presentations identified by the media identification information and the one or more second media presentations identified by the second media identification information based on the user preferences; and after selecting the second recommended media presentation, providing a second recommendation for the second recommended media presentation to the client media player of the user.

23. The method of claim 22 wherein each of the one or more heavy influencers is a celebrity.

24. The method of claim 22 wherein receiving the media identification information comprises receiving the media identification information in substantially real time as the one or more media presentations identified by the media identification information are played by the media associated with the one or more heavy influencers.

25. The method of claim 22 wherein the central server is communicatively coupled to the media players associated with the one or more heavy influencers via a network, receiving the media identification information comprises receiving the media identification information at the central server, and selecting the first recommended media presentation comprises selecting the first recommended media presentation at the central server.

26. The method of claim 25 wherein the client media player is communicatively coupled to the central server via the network, and the first recommended media presentation is selected and the first recommendation for the recommended media presentation is provided to the client media player for a subscription fee.

27. The method of claim 22 wherein the first recommendation comprises information identifying the first recommended media presentation.

28. The method of claim 22 wherein providing the first recommendation comprises automatically providing the first recommendation to the client media player once a previous recommendation has expired.

29. The method of claim 22 wherein providing the first recommendation comprises providing the first recommendation to the client media player upon request.

30. The method of claim 22 wherein the first recommendation comprises a preview of the first recommended media presentation.

31. The method of claim 22 wherein the first recommendation comprises the first recommended media presentation.

32. A central server for providing media recommendations comprising:
  a communication interface communicatively coupling the central server to one or more media players associated with a plurality of heavy influencers and a client media player associated with a user; and
  a control system associated with the communication interface and adapted to:
    obtain a user selection of one or more heavy influencers of the plurality of heavy influencers, the user selection based upon input from the user of the client media player;
    determine user preferences and filter criteria associated with the user of the client media player;
    receive, from media players associated with the one or more heavy influencers, media identification information identifying one or more media presentations in response to the one or more media presentations being played by the media players associated with the one or more heavy influencers, each of the one or more media presentations being a song or a video;
    filter the media identification information based on the filter criteria to remove media identification information identifying media presentations that are not to be recommended;
    after filtering the media identification information, select a first recommended media presentation for the user from the one or more media presentations played by the media players associated with the one or more heavy influencers based on the user preferences;
    after selecting the first recommended media presentation, provide a first recommendation for the first recommended media presentation to the client media player of the user;
    receive, from the media players associated with the one or more heavy influencers, second media identification information identifying one or more second media presentations in response to the one or more second media presentations being played by the media players associated with the one or more heavy influencers, each of the one or more second media presentations being a song or a video;
    filter the second media identification information based on the filter criteria to remove second media identification information identifying second media presentations that are not to be recommended;
    after filtering the second media identification information, select a second recommended media presentation from the second media presentations identified by the second media identification information based on the user preferences; and
    after selecting the second recommended media presentation, provide a second recommendation for the second recommended media presentation to the client media player of the user.

33. The central server of claim 32 wherein the user selection of the one or more heavy influencers includes one or more individually selected heavy influencers.

34. The central server of claim 32 wherein the user selection of the one or more heavy influencers includes one or more selected predefined groups of heavy influencers.

35. The central server of claim 32 wherein each of the plurality of heavy influencers is a person having substantial influence over media presentations played by other persons.

36. The central server of claim 32 wherein each of the plurality of heavy influencers is a celebrity.

37. The central server of claim 32 wherein the media identification information is provided to the central server in substantially real time as the one or more media presentations identified by the media identification information are played by the media players associated with the one or more heavy influencers.

38. The central server of claim 32 wherein the control system is further adapted to select the first recommended media presentation for the user from the one or more media presentations including the media presentations identified by the first media identification information and provide an associated recommendation to the client media player for a subscription fee.

39. A method of operating a central server to provide media recommendations to a client media player of a user, comprising:
  obtaining a user selection of one or more heavy influencers, the user selection based upon input from the user of the client media player;
  determining user preferences and filter criteria associated with the user of the client media player;

receiving, from media players associated with the one or more heavy influencers, media identification information identifying one or more media presentations in response to the one or more media presentations being played by the media players associated with the one or more heavy influencers, each of the one or more media presentations being a song or a video;

filtering the media identification information based on the filter criteria to remove media identification information identifying media presentations that are not to be recommended;

selecting a recommended media presentation from the one or more media presentations played by the media players associated with the one or more heavy influencers based on the user preferences; and providing a recommendation for the recommended media presentation to the client media player of the user.

40. A central server for providing media recommendations comprising:

a communication interface communicatively coupling the central server to one or more media players associated with a plurality of heavy influencers and a client media player associated with a user; and a control system associated with the communication interface and adapted to:

obtain a user selection of one or more heavy influencers of the plurality of heavy influencers, the user selection based upon input from the user of the client media player;

determine user preferences and filter criteria associated with the user of the client media player;

receive, from media players associated with the one or more heavy influencers, media identification information identifying one or more media presentations in response to the one or more media presentations being played by the media players associated with the one or more heavy influencers, each of the one or more media presentations being a song or a video;

filter the media identification information based on the filter criteria to remove media identification information identifying media presentations that are not to be recommended;

select a recommended media presentation from the one or more media presentations played by the media players associated with the one or more heavy influencers based on the user preferences; and provide a recommendation for the recommended media presentation to the client media player of the user.

* * * * *